Oct. 17, 1967
C. B. RICHEY
3,347,188
SOIL INCORPORATOR
Filed Feb. 4, 1965
3 Sheets-Sheet 1
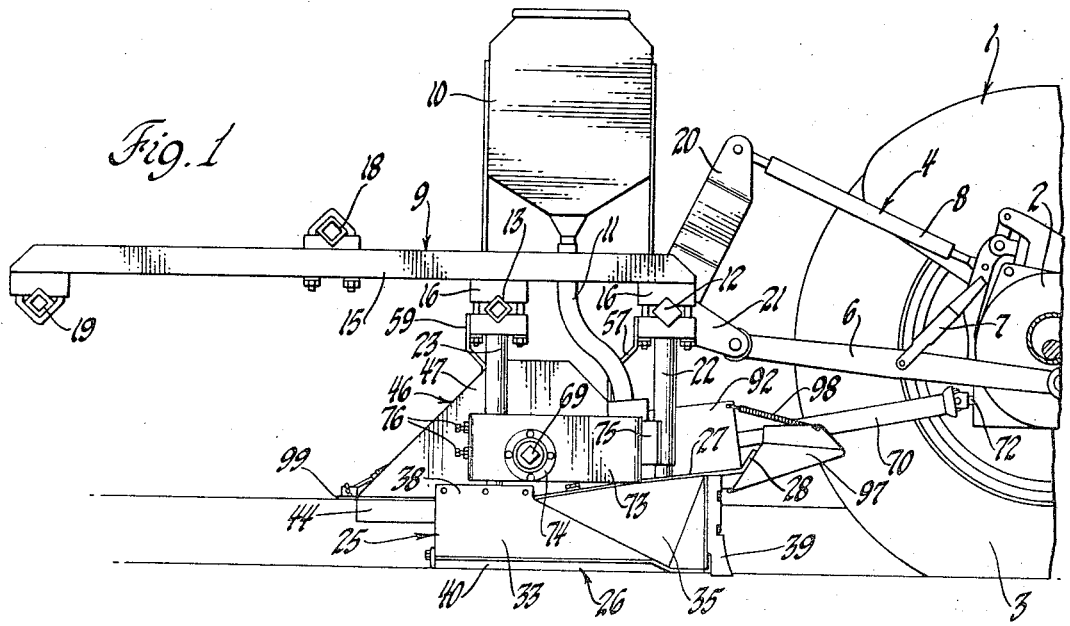
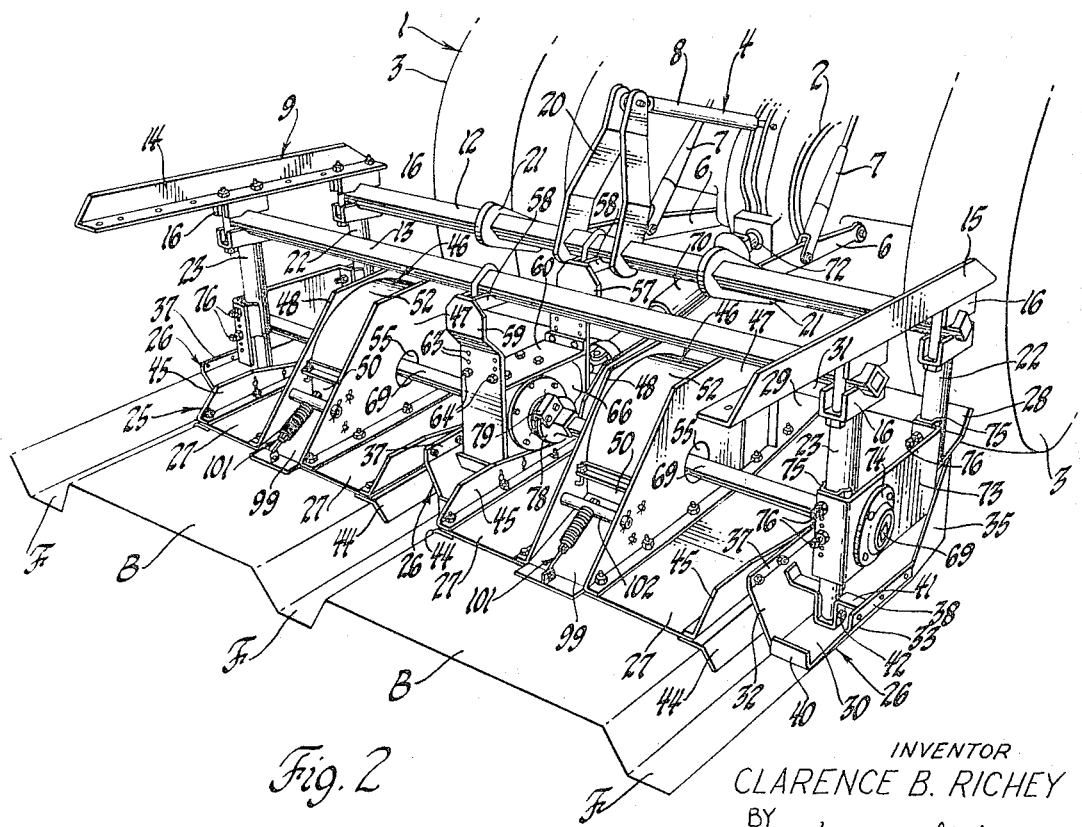
INVENTOR
CLARENCE B. RICHEY
BY
Tweedale & Gerhardt
ATTORNEYS.

Oct. 17, 1967

C. B. RICHEY 3,347,188

SOIL INCORPORATOR

Filed Feb. 4, 1965

INVENTOR
CLARENCE B. RICHEY
BY
Tweedale & Gerhardt
ATTORNEYS.

Oct. 17, 1967

C. B. RICHEY 3,347,188

SOIL INCORPORATOR

Filed Feb. 4, 1965

INVENTOR
CLARENCE B. RICHEY
BY
Tweedale & Gerhardt
ATTORNEYS.

United States Patent Office 3,347,188
Patented Oct. 17, 1967

3,347,188
SOIL INCORPORATOR
Clarence B. Richey, Fresno, Calif., assignor to Massey-Ferguson Inc., Detroit, Mich.
Filed Feb. 4, 1965, Ser. No. 430,298
17 Claims. (Cl. 111—10)

ABSTRACT OF THE DISCLOSURE

Apparatus for preparing seed beds and simultaneously incorporating herbicides and other soil treating materials into the seed bed soil which includes a rotary tool assembly having radial blades mounted between a pair of discs. Each pair of discs and its associated blades are enclosed in a housing having side walls and a cover member for enclosing the soil working tool assembly. Herbicides are deposited onto the ground ahead of the tool assembly to be worked into the soil.

---

This invention relates generally to agricultural apparatus and more particularly to apparatus for preparing seed beds and simultaneously incorporating herbicides, fumigants, agricultural chemicals and other soil treating materials into the seed bed soil.

With the continuing decline of farm labor and the concurrent development of new and more effective weed killing chemicals, a technique of applying soil treating materials to the soil of seed beds known as "soil incorporation" has come into use. The term "soil incorporation" refers to the technique of mixing herbicides and other soil treating materials into the soil mechanically prior to the sowing of seeds in the seed bed.

Mechanical incorporation of the material is necessary to prevent loss or breakdown of volatile chemicals due to evaporation, and to prevent the soil treating material from being blown and washed away by wind and rain. With some materials, thorough incorporation reduces the amount of moisture required for the material to be effective in controlling weeds.

In order to reduce waste to a minimum and obtain optimum concentration of the soil treating material, the material must be applied and incorporated to a precise depth over an accurately confined band on the seed bed.

For simultaneously forming the seed beds and incorporating the soil treating material in the seed bed soil, incorporators have been combined with sled type implements which operate to form beds and furrows when pulled across the surface of a field. One such implement is disclosed generally in the copending U.S. patent application S.N. 358,302 filed Apr. 8, 1964, now Patent No. 3,187,822, and assigned to the assignee of the present invention. The combined bed shaping-incorporating implement not only makes it possible to simultaneously form and treat the seed beds, but the sled assists in controlling the working depth of the incorporator.

An object of this invention is therefore to provide apparatus for incorporating soil treating material into seed beds wherein the material is incorporated into the soil to a precise depth and width in the seed row area of the bed.

Another object is to provide apparatus for incorporating soil treating material into the soil of seed beds having a soil working tool operable to work the soil and mix material therewith in an accurately confined band in the seed row area of the bed leaving the soil undisturbed at the sides of the band.

Still another object is to provide soil incorporating apparatus in which the depth of incorporation can be adjusted accurately to accommodate varying conditions.

A further object lies in the provision of apparatus for incorporating soil treating material in the soil of seed beds that can be utilized with existing planting and tilling implements for combined operations.

Yet another object is to provide apparatus for incorporating soil treating materials in seed beds that can be mounted on conventional tractor hitch linkages and driven by the power-take-off shaft of the tractor wherein the drive connection from the power-take-off shaft is protected from dust and soil in all positions of the apparatus with respect to the tractor.

Still another object is to provide a combined seed bed shaping sled and soil incorporator for simultaneously forming seed beds and treating the seed row area of the bed with herbicides and other soil treating materials to a precise depth and width.

In carrying out the foregoing, and other objects, apparatus embodying the present invention includes an implement frame having laterally spaced pairs of depending standards. Supported beneath the frame intermediate the ends thereof is a gearbox or transmission having an input shaft and laterally projecting output shafts. The gearbox is adjustable vertically on the frame, and mounted for vertical adjustment on each pair of standards is a bearing support plate each rotatably supporting one end of a rotor shaft, the other end of which is coupled to the adjacent output shaft of the gearbox.

Mounted on each rotor shaft for rotation therewith is a soil working and incorporating tool assembly including a plurality of radial blades mounted between a pair of discs. A housing encloses each tool assembly, and the side walls of the housings are formed with enlarged openings for receiving the rotor shafts and permitting vertical adjustment thereof.

Universally coupled to the input shaft of the gearbox is a drive shaft for connecting the gearbox with the tractor power-take-off shaft. For protecting the drive shaft coupling from dirt, dust and rocks, a pivoted shield member is biased toward the drive shaft and follows the movement thereof so as to protect the drive shaft in all positions.

Preferably, the incorporator housings are supported on a sled type bed shaping unit having furrow forming guides and horizontal bed shaping panels with the housings mounted between the opposed edges of adjacent pairs of the bed shaping panels.

As soil treating material is deposited in the seed bed ahead of the incorporating tools, it is mixed into the soil to a depth determined by the vertical position of the rotor shaft and gearbox with respect to the implement frame. The discs on either side of the soil working tools laterally confines the soil and chemical mixture to the width determined by the axial spacing of the discs on the rotor shafts.

The treated strip or band is then compacted by a plate pivotally mounted on the trailing end of the housings and adjustably biased to engage the ground. By adjusting the biasing force on the compaction plate, the degree of compaction can be varied as desired.

Other objects, advantages and features of the invention will become apparent from the following description taken in connection with the accompanying drawings in which:

FIG. 1 is an elevational view of apparatus embodying the invention in its preferred form;

FIG. 2 is a perspective view of the apparatus of FIG. 1 with certain parts being removed for clarity of illustration;

Figure 3:
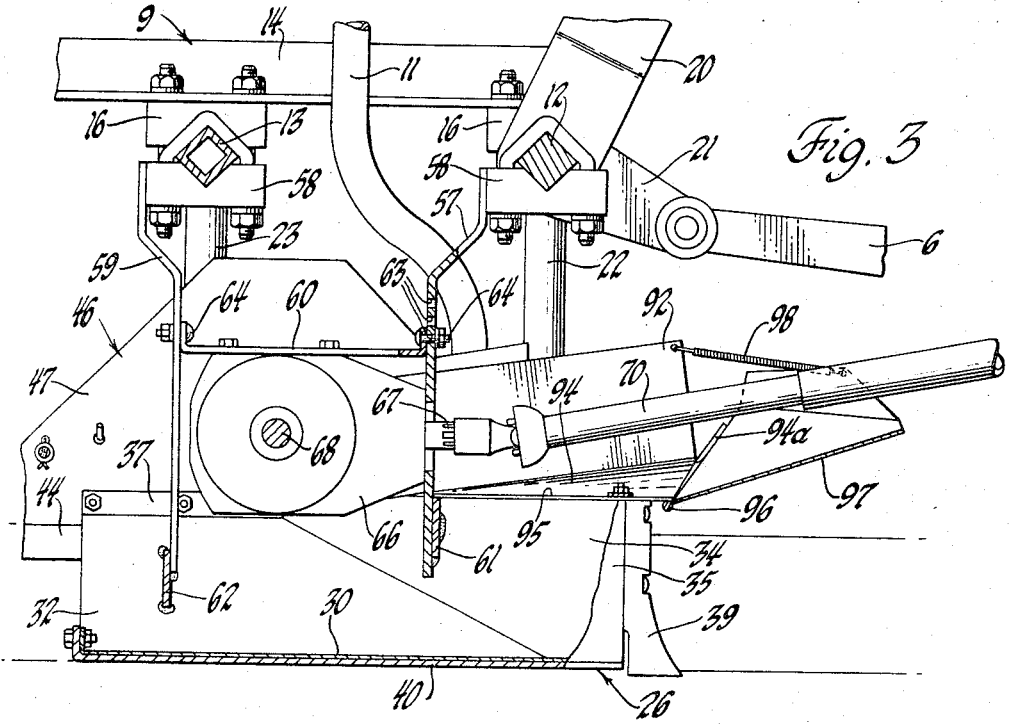
FIG. 3 is a longitudinal sectional view of the apparatus of FIG. 1.

While the foregoing specification and accompanying drawings describe and illustrate a specific embodiment of the invention, it should be understood that the invention is not limited to the exact construction shown, but that various equivalents, alternative arrangements, and modifications in the construction are possible without departing from the scope and spirit of the invention.

With reference to FIGS. 1 and 2, reference numeral 1 designates a tractor having a chassis 2 and rear wheels 3. Tractor 1 is provided with a conventional hydraulic three-point hitch mechanism 4 including a pair of lower draft links 6 pivotally mounted on the tractor chassis and connected with hydraulic actuating mechanism by drop links 7, and a top link 8 pivotally connected at its forward end with the tractor chassis.

Mounted on the hitch linkage 4 is a carrier frame 9 on which is supported a container 10 for herbicides or other soil treating chemicals having a dispensing tube 11 for depositing the chemicals on the surface of the seed bed. Carrier frame 9 includes front and rear transverse tool bars or frame members 12 and 13, respectively, which are secured together in spaced parallel relationship by side frame members 14 and 15. Side frame members 14 and 15 are connected with frame members 12 and 13 by clamp assemblies 16 of conventional construction. In FIG. 1, auxiliary transverse tool bars or frame members 18 and 19 are supported between side frame members 14 and 15 on which seed and fertilizer containers, as well as planting and other cultivating implements may be supported. Container 10, as well as auxiliary frame members 18 and 19, are omitted in FIG. 2 for clarity of illustration.

Centrally mounted on the front transverse tool bar 12 is a hitch frame 20 which is pivotally connected with the rear end of top link 8, and a pair of hitch brackets 21 spaced laterally on each side of hitch frame 20 on frame member 12 are pivotally connected with the lower draft links 6. Secured to the clamping assembly 16 at each end of frame members 12 and 13 are pairs of depending legs or standards including front and rear standards 22 and 23, respectively.

Supported on the lower ends of standards 22 and 23 is a sled type bed shaper indicated generally by reference numeral 25 and including a plurality, in this case three, of furrow forming guides or sleds 26. Horizontal seed bed shaping panels 27 project outwardly from the upper edges of adjacent pairs of the guides 26 with their forward portions inclined upwardly and forwardly as viewed in FIG. 2. An upwardly inclined lip 28 is formed at the forward end of each panel 27. Secured between the adjacent shaping panels 27 at their forward ends is a panel or shield 29 having an upwardly inclined lip 31 which With reference to FIGS. 1, 2 and 3, each guide 26 is coextensive with lips 28 of the shaping panels 27. is formed with a bottom wall 30, side wall panels 32 and 33, and front wall panels 34 and 35. Side wall panels 32 and 33 are inclined upwardly and outwardly from the side edges of bottom wall 30 and are each formed with vertical flanges 37 and 38, respectively, at their upper edges. Flanges 37 and 38 are preferably disposed in parallel relationship with the longitudinal axis of guide 26. The front panels 34 and 35 converge toward the front from from side panels 32 and 33, and a front end fitting 39 of generally triangular cross section is secured to the converging ends of the side panels to define a point for the guide member. Secured to bottom wall 30 of each of the guide members 26 is a wear plate 40.

The lower ends of standards 22 and 23 are received in strap members 41 having central U-shaped sections and are secured thereto by bolts 42 (FIG. 2). The edges of shaping panels 27 adjacent guides 26 are clamped between the opposed flanges of a pair of reversely mounted angle brackets 44 and 45 as shown in FIG. 2. Bracket 45 secures the upper edge of panel 27 to flange 37 or 38 of the adjacent guide member 26, and member 44 projects rearwardly of guide member 26 to shape the edge between seed bed B and the adjacent side wall of furrows F.

Figure 4:
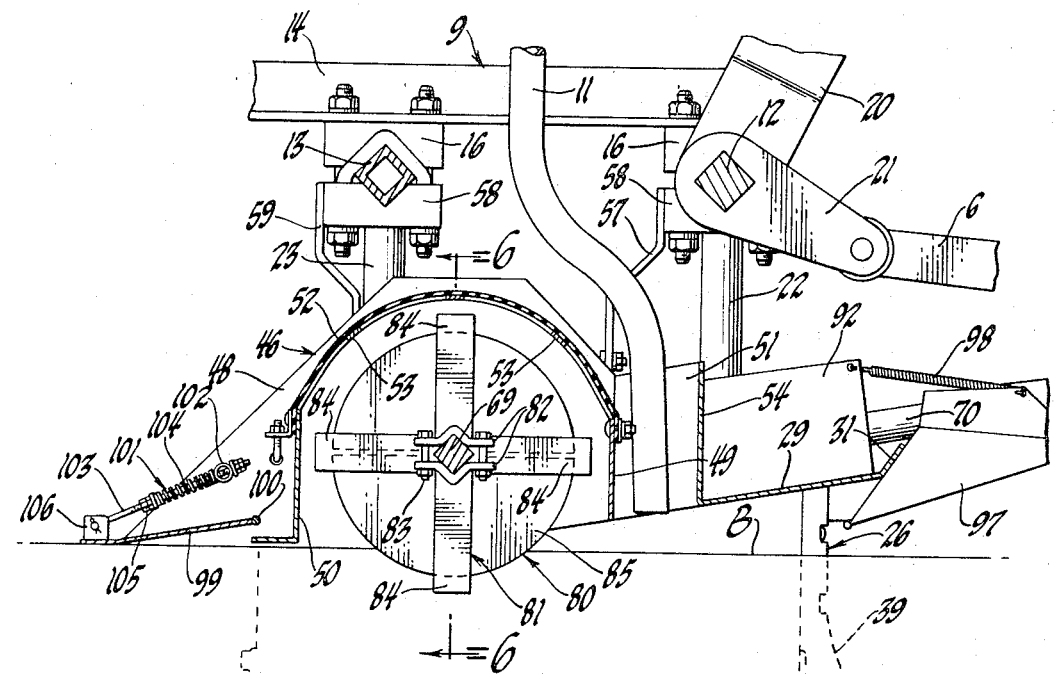
FIG. 4 is a longitudinal sectional view through one of the housings of the incorporator assemblies.
Figure 6:
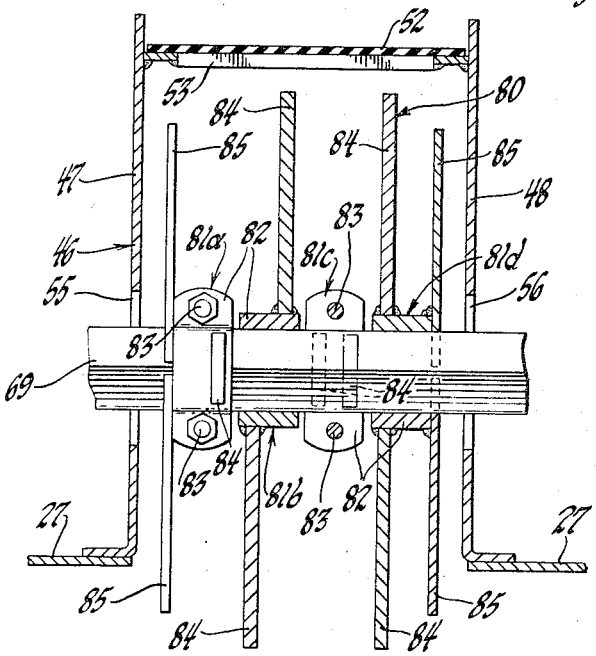
FIG. 6 is a sectional view taken on line 6—6 of FIG. 4.

Mounted between the inner edges of adjacent pairs of shaping panels 27 is an incorporator housing 46 having side walls 47 and 48, a front wall 49, and a rear wall 50 (FIGS. 2 and 4). Supported on slat members 53 between side walls 47 and 48 is a shield or cover 52 of rubber or similar material having its edges clamped at the upper edges of front and rear walls 49 and 50, respectively. Extending between side walls 47 and 48 forwardly of front wall 49 is a vertical panel 54 defining, with side walls 47, 48 and front wall 49, an opening 51 for receiving the dispensing tube from container 10. Side walls 47 and 48 are respectively formed with aligned openings 55 and 56 as shown in FIG. 6.

Depending from front and rear frame members 12 and 13 intermediate their ends are front and rear vertical support brackets 57 and 59, respectively. The vertical support brackets are secured at their upper ends to clamp assemblies 58 mounted on the central portions of tool bars 12 and 13. The lower ends of vertical support brackets 57 and 59 are attached by welding to bars 61 and 62 extending transversely between the front and side walls, respectively, of the central guide member 26. Extending fore-and-aft between brackets 57 and 59 is a horizontal support plate 60 which is secured in one set of a plurality of opposed, vertically spaced sets of aligned openings 63 in support brackets 57 and 59. The end flanges of plate 60 are secured to brackets 57 and 59 by bolts 64 extending through openings 63.

Figure 5:
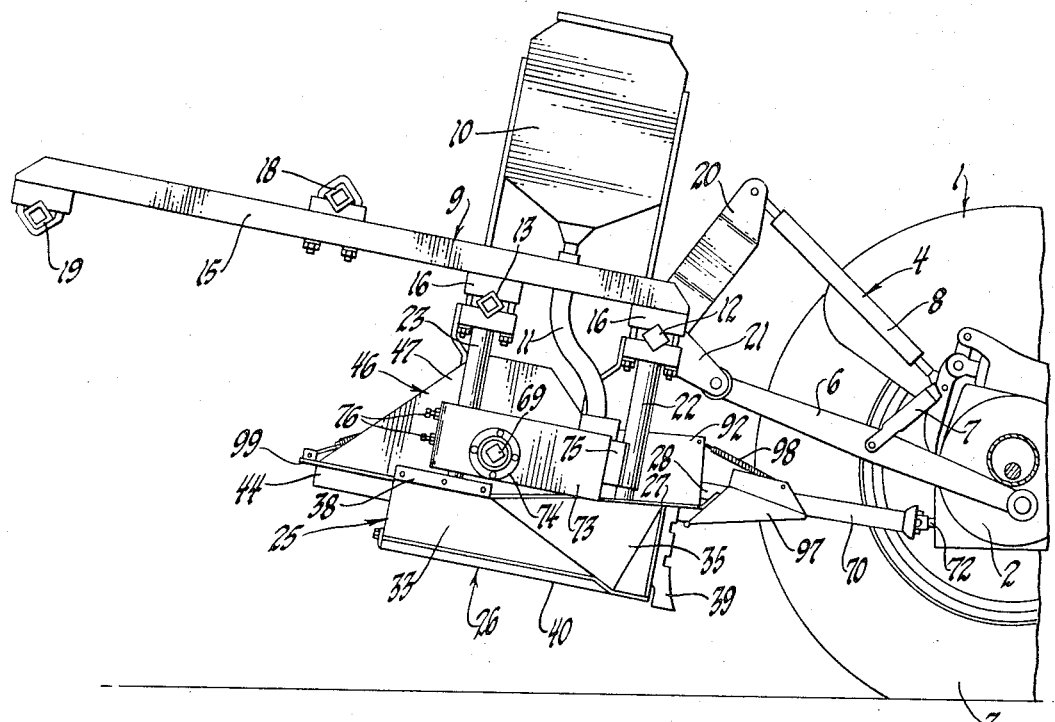
FIG. 5 is a view similar to FIG. 1 with the apparatus shown in its transport position on the tractor linkage.

Secured to support plate 60 on the lower side thereof is a transmission unit or gearbox 66 having an input shaft 67 and laterally extending output shafts 68. Coupled to output shafts 68 is a pair of rotor shafts 69 which extend transversely, in parallel relationship with frame members 12 and 13 through the openings 55 and 56 in housings 46. Openings 55 and 56 are enlarged with respect to rotor shafts 69 to accommodate vertical adjustment of the shafts. Rotor shaft 69 is driven by a drive shaft 70 universally coupled to input shaft 67 of the gearbox and to the PTO shaft 72 of the tractor (FIGS. 1 and 5). The outer ends of rotor shaft 69 are rotatably supported in bearings 74 carried by bearing plates 73 mounted on standards 22 and 23.

Bearing plates 73 are each secured by bolts 76 to brackets 75 welded onto standards 22 and 23. Brackets 75 are each provided with a series of vertically spaced openings for receiving bolts 76. Consequently, bearing plates 73 can be vertically adjusted on standards 22 and 23 by removing bolts 76 from one to the other of the vertically spaced openings in the brackets 75.

Rotor shafts 69 are of square or non-circular cross section and are secured to their respective output shafts 68 by means of coupling plates 78, the output portion of which also is of square or complementary cross section for receiving the rotor shaft. The coupling plates 78 are clamped together by a clamp 79 as shown in FIG. 2. Rotor shaft 69 is preferably loosely received in the output portion of coupling plate 78 to permit moderate misalignment of the shaft with respect to the coupling plate and output shaft 68.

Mounted on rotor shaft 69 within housings 46 is a soil working and incorporating tool assembly 80 including a plurality, in this instance four, of knives or cutters 81a, 81b, 81c and 81d. Cutters 81 each include complementary hub or clamp members 82 secured together, and against axial movement on rotor shaft 69, by bolts 83. Welded to each clamp member 82 and extending radially from the axis of shaft 69 is a blade 84.

As shown in FIG. 6, the blades 84 of each cooperating pair of clamp members 82 of cutters 81b and c are offset axially from each other and extend radially in opposite directions from the rotor shaft 69. Thus, in the illustrated embodiment, the eight blades 84 are substantially evenly spaced along the axis of shaft 69. Moreover, each adjacent pair of cutters 81 are angularly displaced 90 degrees with respect to each other, that is, the blades 84 of cutter 81a project at right angles from the blades 84 of cutter 81b and so forth.

Welded or otherwise secured to the outer clamps 81a and 81d are disc members 85, which, upon rotation of shafts 69, confine the soil working and incorporating action of blades 84 to the space between discs 85. The radii of disc members 85 is slightly less than the length of blades 84, but the disc penetrate the soil as shown in FIG. 4 during operation of the incorporator to prevent the soil at the sides of disc members 85 opposite blades 84 from being disturbed by the action of blades 84, and prevent the soil and chemical mixture from being scattered outwardly beyond the seed row.

As shown in FIGS. 3 and 4, a pair of laterally spaced, vertical side plate members 92 project forwardly from bracket 57. A horizontal shield plate 94 having a recessed groove 95 formed therein is supported on the central guide member 26 between plates 92. Pivotally mounted on the forward end of plate 94 by means of a pin 96 is a drive shaft shield 97 which is biased into engagement with a lip 94a, coextensive with lips 28 and 31, by a spring 98. Thus, as the drive shaft 70 pivots vertically about its connection with input shaft 67, shield 97 may follow the downward movement of the drive shaft and prevent soil from spilling over lip 94a.

The flexible dispensing tube 11 of container 10 is received in the recess defined by front wall 49 and panel 54 in advance of the incorporator housing 46. Thus, as the tractor moves forwardly to shape the beds B and furrows F, the herbicide or soil treating chemical is deposited in the central seed row portion of the beds ahead of the soil working and incorporating tool assemblies 80. As the tractor advances, shaft 69 is driven to rotate about its longitudinal axis to cause the blades 84 to stir and work the chemical into the soil in a band having a width determined by the space between discs 85 (FIG. 6). Discs 85 prevent blades 84 from throwing the dirt outwardly to confine the treatment to the seed row area of the bed.

The beds are shaped by shaping panels 27 on either side of the treated strip, and the treated band or strip is then compacted by a compacting plate 99 pivotally mounted by a pin 100 between side wall members 47 and 48 adjacent the trailing ends thereof. Plate 99 is biased downwardly to compact the treated area by a spring and rod assembly 101 including a transverse tubular member 102 extending between side walls 47 and 48, a rod 103 slideably mounted in tube 102, and a spring 104 seated between tube 102 and a pair of nuts 105 threadedly mounted on rod 103. Rod 103 is pivotally connected to a bracket member 106 at the trailing end of compacting plate 99. Thus, by adjusting the biasing force of spring 104 by means of nuts 105, the amount of compaction can be selectively varied.

Generally, the soil is loosened by plowing or discing prior to formation of the seed beds. The sled 25 is then attached to the tractor and is drawn over the loosened soil to form beds B and furrows F as shown in FIG. 2. Shaping panels 27, in cooperation with guide members 26, form the alternating beds and furrows. As the sled 25 passes over the ground, the chemical is continuously dispensed through tube 11 in advance of the rotating blades 84 where it is thoroughly mixed with the soil by blades 84 and confined laterally by discs 85. The working depth of incorporator assemblies 80 can be varied selectively by adjusting plates 73 and gearbox 66 vertically on standards 22, 23 and brackets 57, 59, respectively. The rubber shield 52 of the incorporator housings prevents the buildup of moist soil on the housing wall. Shield 97 is maintained in a protective position with respect to drive shaft 70 by springs 98 and can be depressed about pivot 96 by the drive shaft without damage when the sled is lifted to the transport position illustrated in FIG. 5.

While the illustrated sled unit 25 consists of a two bed unit, it is obvious that any number of incorporators, and bed shapers can be provided. By attaching planting and fertilizing equipment to frame 9, the entire planting and treating operation can be carried out simultaneously.

While only one specific form of the invention has been illustrated and described in the foregoing specification, it will be apparent to those skilled in the art that other forms of the invention may be adopted without departing from the scope and spirit of the appended claims.

What is claimed is:

1. Apparatus for incorporating soil treating chemicals in seed beds comprising a frame movable along a seed bed, a transverse rotor shaft supported on said frame, and a soil working and incorporating tool assembly mounted on said rotor shaft including a plurality of cutters mounted adjacent each other along the axis of the rotor shaft, each of said cutters comprising a hub member non-rotatably mounted on said rotor shaft and a pair of blades projecting radially in opposite directions from the axis of the rotor shaft operable upon rotation of the rotor shaft to work the seed bed soil and incorporate therein soil treating chemicals deposited on the seed bed ahead of said tool assembly, said pair of blades being spaced from each other on said hub members in an axial direction, and the blades of each adjacent pairs of said cutters projecting radially from said rotor shaft at substantially right angles with respect to each other, said tool assembly further including means engageable with the ground as said frame advances along the seed bed for preventing the soil worked by said blades from spreading laterally outwardly of said tool assembly.

2. Apparatus as defined in claim 1 wherein said last named means comprises discs secured to the hub members of the outer cutters of said tool assembly, the diameter of said discs being such that the peripheral edges of the discs engage the ground during operation of said blades.

3. Apparatus as defined in claim 2 further including a pair of laterally spaced bearing plates carried by said frame, said rotor shaft being rotatably supported in said bearing plates, and means for vertically adjusting said bearing plates on said frame to selectively vary the working depth of said tool assembly.

4. Apparatus as defined in claim 3 further including compacting means carried by said frame and trailing said soil working and incorporating tool assembly, said compacting means being operable to compact the soil worked by said tool assembly, and means adjustably biasing said compacting means into engagement with the surface of the seed bed over a width defined substantially by the space between said discs permitting the compaction pressure to be selectively varied.

5. Apparatus as defined in claim 4 further including a gearbox supported on said frame having input and output shafts, means coupling the rotor and output shafts together against movement relative to each other, and means for selectively vertically adjusting the gearbox on said frame to vary the working depth of said tool assembly.

6. Apparatus as defined in claim 5 further including a drive shaft pivotally coupled to the input shaft of said gearbox, a shield carried by said frame for pivotal movement with respect thereto, and means biasing said shield to a protective position with respect to the underside of said drive shaft, said shield being pivotally movable by said drive shaft to maintain said protective position in all positions of said drive shaft with respect to said frame.

7. Apparatus for incorporating soil treating materials in seed beds comprising; a frame movable along a longitudinal seed bed having front and rear transverse frame members secured together in spaced parallel relationship, a pair of front and rear depending standards mounted on said front and rear transverse frame members, respectively, adjacent each end thereof, a bearing support plate mounted between each pair of front and rear standards and extending in a fore-and-aft direction with respect to said frame, a gearbox supported on said front and rear transverse frame members intermediate the ends thereof having an input shaft and a pair of oppositely extending output shafts, a pair of oppositely extending transverse rotor shafts each having one end rotatably supported in one of said bearing plates and its other end coupled to one of said output shafts, a soil working tool assembly mounted on each of said rotor shafts operable upon rotation of said rotor shafts to work the soil in the central, seed row area of a seed bed and mix soil treating material deposited on the seed bed ahead of said tool assembly into the soil of the seed row area, and means for adjusting said bearing support plates vertically on said standards to selectively raise and lower said rotor shafts to vary the working depth of said soil working tool assembly.

8. Apparatus as defined in claim 7 further including front and rear support brackets secured to and depending from said front and rear transverse frame members, respectively, intermediate the ends thereof, a support plate mounted between said front and rear support brackets, said gearbox being mounted on said support plate, and means for adjusting said support plate vertically on said front and rear brackets to correspondingly raise and lower said gearbox with said bearing support plates.

9. Apparatus as defined in claim 8 further including a drive shaft universally coupled to the input shaft of said gearbox, a shield plate extending forwardly from said gearbox beneath said input shaft, a longitudinal recess in said shield for accommodating vertical movement of said drive shaft with respect to said frame, a drive shaft shield pivotally mounted on said shield plate and projecting forwardly therefrom, and means biasing said drive shaft shield in an upward direction to shield said drive shaft and follow the vertical movement of said drive shaft with respect to said frame.

10. Apparatus as defined in claim 9 further including a pair of housings supported on said frame each enclosing one of said soil working tool assemblies, each housing having a pair of spaced side walls extending in a fore-and-aft direction, said side walls having enlarged, aligned openings receiving said rotor shafts and permitting vertical adjustment of said rotor shafts with respect to said side walls, said soil working tool assemblies projecting beneath the lower edges of said side walls for engagement with the ground therebetween, and said housings each including front, rear and top walls extending between said side walls to enclose said soil working tool assemblies.

11. Apparatus as defined in claim 10 further including a compacting plate mounted between said side walls adjacent the rear edges thereof for vertical movement with respect thereto, and means adjustably biasing said compacting plate into engagement with the ground to compact the soil worked by said soil working tool assemblies.

12. Apparatus as defined in claim 11 further including bed shaping panels projecting laterally outwardly from the lower edges of each of said side walls for shaping engagement with the seed bed surface on each side of the seed row area.

13. Apparatus as defined in claim 12 wherein said soil working tool assemblies each include a plurality of hub members non-rotatably mounted on its associated rotor shaft axially adjacent each other, a pair of blades secured to each hub and projecting radially in opposite directions from the rotor axis, adjacent pairs of said hubs being angularly displaced with respect to each other such that the blades of one of said adjacent pairs of hubs projects at an angle of substantially 90 degrees from said rotor axis with respect to the other of said adjacent pairs of hubs, and a soil engaging disc member secured to the outer end of the outer hubs of said assembly for confining the action of said blades between said discs.

14. Apparatus for shaping seed beds and incorporating soil treating chemicals therein comprising; a transverse frame, a sled supported beneath said frame including a plurality of laterally spaced, furrow forming guides, a pair of spaced seed bed shaping panels each supported on the opposed, upper edges of adjacent pairs of said guides and projecting laterally therefrom toward each other, a housing mounted between the spaced, opposed edges of each of said pairs of seed bed shaping panels, said housing having a pair of side walls projecting upwardly from the spaced opposed edges of said pair of seed bed shaping panels and front and rear walls extending between said side walls, a cover supported between said side walls and front and rear walls, a pair of support brackets spaced fore-and-aft with respect to each other extending between said frame and one of said guide members, a gearbox supported between said support brackets having a forwardly projecting input shaft and a pair of laterally projecting output shafts, enlarged, aligned openings in the side walls of each of said housings, a pair of rotor shafts each having one end coupled to one of said output shafts and extending in opposite transverse directions through the openings in said housing side walls, a pair of laterally spaced bearing support plates supported beneath said frame adjacent each end of said sled, the other ends of said rotor shafts being rotatably supported in said bearing support plates, a soil working and incorporating tool mounted on said rotor shafts within each of said housings for working the soil beneath said housing and incorporating chemicals therein deposited on the seed bed ahead of said tool, and means for vertically adjusting said gearbox and bearing support plates on said frame to selectively vary the working depth of said soil working tools.

15. Apparatus as defined in claim 14 further including an upwardly projecting lip on the front transverse edge of said sled, a drive shaft universally coupled to the input shaft of said gearbox, a shield for said drive shaft pivotally mounted on said sled adjacent the front end thereof, and means biasing said shield into engagement with said lip to at least partially enclose a portion of said drive shaft and permitting said shield to be pivoted downwardly by said drive shaft upon downward pivotal movement of the drive shaft with respect to the sled.

16. Apparatus as defined in claim 14 further including a compaction plate mounted on the trailing end of each of said housings for vertical movement with respect thereto, and means adjustably biasing said compaction plate to engage the ground and compact the soil in the area worked by said tools.

17. Apparatus as defined in claim 14 wherein said soil working and incorporating tool comprises a plurality of cutters mounted on said shaft within said housing, each of said cutters comprising a hub-member non-rotatably secured to said rotor shaft, a pair of axially spaced blades on said hub projecting radially in opposite directions from the axis of said rotor shaft, the blades of each adjacent pair of cutters projecting from said rotor shaft at substantially right angles with respect to each other, and a disc secured to the hubs of the outer cutters for preventing soil worked by said blade from spreading laterally beyond the seed row area of the bed.

(References on following page)

References Cited

UNITED STATES PATENTS

| | | | |
|---|---|---|---|
| 1,183,828 | 5/1916 | Bjorkman | 172—548 |
| 2,795,176 | 6/1957 | O'Hara | 172—112 X |
| 3,131,657 | 5/1964 | Morris | 172—551 X |
| 3,235,012 | 2/1966 | Johnson et al. | 172—157 |

FOREIGN PATENTS 570,258   2/1959   Canada.

ABRAHAM G. STONE, *Primary Examiner.*

ANTONIO F. GUIDA, *Examiner.*

A. E. KOPECKI, *Assistant Examiner.*